United States Patent
Murphy (10) Patent No.: US 10,782,448 B2
(45) Date of Patent: Sep. 22, 2020

(54) SHORT-TERM THUNDERSTORM FORECAST AND SEVERE WEATHER ALERT SYSTEM AND METHOD

(71) Applicant: Vaisala, Inc., Louisville, CO (US)

(72) Inventor: Martin J. Murphy, Boulder, CO (US)

(73) Assignee: Vaisala, Inc., Louisville, CO (US)

( * ) Notice: Subject to any disclaimer, the term of this patent is extended or adjusted under 35 U.S.C. 154(b) by 558 days.

(21) Appl. No.: 15/647,065

(22) Filed: Jul. 11, 2017

(65) Prior Publication Data
US 2018/0031737 A1    Feb. 1, 2018

Related U.S. Application Data

(60) Provisional application No. 62/368,625, filed on Jul. 29, 2016.

(51) Int. Cl.
*G01W 1/16* (2006.01)
*G01W 1/10* (2006.01)

(52) U.S. Cl.
CPC ............... *G01W 1/16* (2013.01); *G01W 1/10* (2013.01); *Y02A 50/12* (2018.01)

(58) Field of Classification Search
CPC ..................................... G01W 1/16
USPC .......................................... 702/4
See application file for complete search history.

(56) References Cited

U.S. PATENT DOCUMENTS

| | | | |
|---|---|---|---|
| 5,610,813 A | 3/1997 | Greenewald et al. | |
| 6,791,311 B2 | 9/2004 | Murphy et al. | |
| 8,010,289 B1 * | 8/2011 | Ryan | G01W 1/16 702/176 |
| 8,089,391 B1 * | 1/2012 | Woodell | G01S 7/22 342/26 B |
| 8,344,721 B2 * | 1/2013 | Nelson, Jr. | G01V 3/082 324/71.1 |
| 8,836,518 B2 | 9/2014 | Marshall et al. | |
| 10,302,815 B1 * | 5/2019 | Kronfeld | G01S 13/953 |
| 2008/0262732 A1 * | 10/2008 | Davis | G01W 1/16 702/4 |

(Continued)

OTHER PUBLICATIONS

Extended European Search Report dated Nov. 10, 2017 as received in Application No. 17181813.1, 10 Pages.

(Continued)

*Primary Examiner* — Ricky Ngon
(74) *Attorney, Agent, or Firm* — Maschoff Brennan; Paul G. Johnson (57) ABSTRACT

Systems and methods are disclosed to determine the severity of a thunderstorm and/or track the path of a thunderstorm. For instance, multiple thunderstorms may be tracked by assigning detected lightning flashes to thunderstorm objects based on a number of previous lightning flashes assigned to each of the thunderstorm objects and a distance between each of the lightning flashes and each of the thunderstorm objects. In addition, an updated position may be determined for each of the thunderstorm objects based on positions and ages of lightning flashes assigned to each of the thunderstorm objects. The severity of a given thunderstorm may be determined based on lightning rates, types, and/or polarities of lightning flashes and/or lightning pulses of the thunderstorm object.

20 Claims, 6 Drawing Sheets

(56) References Cited

U.S. PATENT DOCUMENTS

2013/0345982 A1* 12/2013 Liu .................. G01W 1/02
702/4

OTHER PUBLICATIONS

Strauss, Cesar et al. "Spatio-temporal clustering and density estimation of lighting data for the tracking of convection events", published in: Atmospheric Research 134 (2013) pp. 87-99, 13 pages.

Vasconcellos, C.A. M. et al. "Electrical thunderstorm nowcasting using lightning data mining", published in: Data Mining VII: Data, Text and Web Mining and their Business Applications, vol. 1, Jun. 27, 2006, pp. 161-166, 6 Pages.

Liu, C., and S. Heckman, 2011: "The application of total lightning detection and cell tracking for severe weather prediction." Proc. Fifth Conf. on the Meteorological Applications of Lightning Data, Seattle, WA, Amer. Meteor. Soc., 8.2. [Available online at https://ams.confex.com/ams/91Annual/webprogram/Paper183895.html.].

Price, C., 2008: "Lightning sensors for observing, tracking and nowcasting severe weather", Sensors, 8, pp. 157-170, 14 pages.

Bedka, K.M., C. Wang, R. Rogers, L.D. Carey, W. Feltz, and J. Kanak, 2015: Examining deep convective cloud evolution using total lightning, WSR-88D, and GOES-14 super rapid scan datasets, Wea. and Fcstg., 30, 571-590.

Bruning, E.C. and D.R. MacGorman, 2013: Theory and observations of controls on lightning flash size spectra, J. Atmos. Sci., 70, 4012-4029.

Carey, L.D. and S.A. Rutledge, 2003: Characteristics of cloud-to-ground lightning in severe and nonsevere storms over the central United States from 1989-1998, J. Geophys, Res., 108, doi:10,1029/2002JD002951.

Cintineo, J.L., M.J, Pavlonis, J.M. Sieglaff, and D.T. Lindsey, 2014: An empirical model for assessing the severe weather potential of developing convection, Wea. and Fcstg., 29, 639-652.

Farnell, C., T. Rigo, and N. Pineda, 2016: Lightning jump as a nowcast predictor: Application to severe events in Catalonia, Atmos. Res., 183, 130-141.

Gatlin, P.N. and S.J. Goodman, 2010: A total lightning trending algorithm to identify severe thunderstorms, J. Atmos. Ocean. Tech., 27, 3-22.

Goodman, S.J. et al., 2013: The GOES-R Geostationary Lightning Mapper (GLM), Atmos. Res., 125-126, 34-49.

Koshak, W.J. and R.J. Solakiewicz, 2015: A method for retrieving the ground flash fraction and flash type from satellite lightning mapper observations, J. Atmos. Ocean. Tech., 32, 79-96.

Medici, G., K.L. Cummins, D.J. Cecil, W.J. Koshak, and S.D. Rudlosky, 2017: The intra-cloud lightning fraction in the contiguous United States, submitted to Mon. Wea. Rev.

Metzger, E.L., 2013: The relationship between total cloud lightning behavior and radar-derived thunderstorm structure, M.S. Thesis, Naval Postgraduate School, Monterey, CA, U.S.

Miller, P.W., A.W. Ellis, and S.J. Keighton, 2015: The utility of total lightning trends in diagnosing single-cell thunderstorm severity: Examples from the central Appalachians region, J. Oper. Met., 3, 92-98.

Murphy, M.J. and A. Nag, 2015: Cloud lightning performance and climatology of the U.S. based on the upgraded U.S. National Lightning Detection Network, Seventh Conf. on Meteorological Applications of Lightning Data, Phoenix AZ, U.S., Amer. Meteorol. Soc.

Witt, A., M.D. Eilts, G.J. Stumpf, J.T. Johnson, E.D. Mitchell, K.W. Thomas, (1998), An enhanced hail detection algorithm for the WSR-88D, Weather and Forecasting, vol. 13, pp. 286-303.

Nag, A., M.J. Murphy, K.L. Cummins, A.E. Pifer, and J.A. Cramer, 2014: Recent evolution of the U.S. National Lightning Detection Network, 23rd Intl. Lightning Detection Conf., Tucson, AZ, U.S., Vaisala Inc.

Rossi, P.J., V. Hasu, K. Halmevaara, A. Mäkelä, J. Koistinen, and H. Pohjola, 2013: Real-time hazard approximation of long-lasting convective storms using emergency data, J. Atmos, Ocean. Tech., 30, 538-555.

Rudlosky, S.D. and H.E. Fuelberg, 2013: Documenting storm severity in the mid-Atlantic region using lightning and radar information, Mon. Wea. Rev., 141, 3186-3202.

Schultz, C.J., W.A. Petersen, and L.D. Carey, 2011: Lightning and severe weather: A comparison between total and cloud-to-ground lightning trends, Wea. and Fcstg., 26, 744-755.

Schultz, C.J., W.A. Petersen, and L.D. Carey, 2009: Preliminary development and evaluation of lightning jump algorithms for the real-time detection of severe weather, J. Appl. Met. and Clim., 48, 2543-2563.

Thomas, R.J., P.R. Krehbiel, W. Rison, S.J. Hunyady, W.P. Winn, T. Hamlin and J. Harlin, 2004: Accuracy of the Lightning Mapping Array, J. Geophys. Res., 109, doi: 10.1029/2004JD004549.

Trapp, R.J., D.M. Wheatly, N.T. Atkins and R.W. Przybylinski, 2006: Buyer beware: Some words of caution on the use of severe wind reports in post-event assessment and research, Wea. and Fcstg., 21, 408-415.

Weiss, S.J., J.A. Hart and P.R. Janish, 2002: An examination of severe thunderstorm wind report climatology: 1970-1999, Preprints, 21st Conf. on Severe Local Storms, San Antonio, TX, U.S.

Williams, E. et al., 1999, The behavior of total lightning activity in severe Florida thunderstorms, Atmos. Res., 51, 245-265.

Witt, A., M.D. Eilts, G.J. Stumpf, E.D. Mitchell, J.T. Johnson and K.W. Thomas, 1998: Evaluating the performance of WSR-88D severe storm detection algorithms, Wea. and Fcstg., 13, 513-518.

Smith, Travis M.,Elmore, Kimberley L., and Dulin, Shannon A., (2004): Damaging downburst prediction and detection algorithm for the WSR-88D. vol. 19, 240-250.

Mallick, S. et al. (2014), An update on testing the performance characteristics of the ENTLN, paper presented at XV International Conference on Atmospheric Electricity, Norman, Oklahoma, U.S.

Meyer, V., (2010), Thunderstorm tracking and monitoring on the basis of three-dimensional lightning data and conventional and polarimetric radar data, Ph.D. thesis, Faculty of Physics, Ludwig-Maximillians Universitat, Munich, Germany.

Mitchell, E.D., S.V. Vasiloff, G.J, Stumpf, A. Witt, M.D. Eilts, J.T. Johnson, and K.W. Thomas (1998), The National Severe Storms Laboratory tornado detection algorithm, Weather and Forecasting, vol. 13, pp. 352-366.

Stumpf, G.J., A. Witt, E.D. Mitchell, P.L. Spencer, J.T. Johnson, M.D. Eilts, K.W. Thomas, and D.W. Burgess, (1998), The National Severe Storms Laboratory mesocyclone detection algorithm for the WSR-88D, Weather and Forecasting, vol. 13, pp. 304-326.

* cited by examiner

SHORT-TERM THUNDERSTORM FORECAST AND SEVERE WEATHER ALERT SYSTEM AND METHOD

CROSS-REFERENCE TO RELATED APPLICATION

This application claims the benefit of and priority to U.S. Provisional App. No 62/368,625, filed on Jul. 29, 2016, which is incorporated herein by reference in its entirety.

BACKGROUND

At present, warnings of severe thunderstorms, at least in the United States, are based primarily or entirely on radar data. Radar data can be used to achieve detailed information about the manifestations of damaging winds, large hail or tornadoes as they develop near or at ground level or at low elevation angles. However, due to spacing between radars and blockage of radar beams at low altitude by terrain or man-made obstructions, there are gaps in radar coverage, and thus the radar data may not be highly accurate. As for high altitude radar data, as the radar scanning strategies may not cover higher altitudes thoroughly, the high altitude radar data may not be always available, although high altitude radar data can provide valuable information about the evolution of a thunderstorm.

The subject matter claimed herein is not limited to embodiments that solve any disadvantages or that operate only in environments such as those described above. Rather, this background is only provided to illustrate one example technology area where some embodiments described herein may be practiced.

SUMMARY OF THE DISCLOSURE

Systems and methods are disclosed to determine the severity of a thunderstorm and/or track the path of a thunderstorm.

In an example embodiment, a method to track thunderstorms may include detecting lightning flashes in an environmental space using lightning detection sensors over a period of time. The method may also include generating lightning data for each of the lightning flashes. The lightning data for each of the lightning flashes may include both a position and time for each of the lightning flashes. The method may also include assigning the lightning flashes to thunderstorm objects, including assigning a given lightning flash of the lightning flashes to a given thunderstorm object of the thunderstorm objects based on a number of previous lightning flashes assigned to the given thunderstorm object. The assignment may also be based on a distance between the given lightning flash and the given thunderstorm object. The distance may be determined based on a most recent position of the given thunderstorm object and a position of the given lightning flash included in corresponding lightning data of the given lightning flash. The method may further include determining an updated position of the given thunderstorm object based on positions and ages of lightning flashes, including the given lightning flash, assigned to the given thunderstorm object.

In another example embodiment, a method to determine severity of a thunderstorm object may include detecting lightning pulses of a thunderstorm object using lightning detection sensors. The lightning pulses may be grouped into lightning flashes. The method may also include generating lightning data for each of the lightning pulses and each of the lightning flashes. The method may also include determining one or more lightning rates, one or more lightning types, and one or more lightning polarities from the lightning data. The method may also include determining a severity of the thunderstorm based on the determined rates, types, and polarities.

In another example embodiment, a lightning detection system may include multiple lightning detection sensors and a processor device. The lightning detection sensors may be configured to detect lightning pulses of a thunderstorm object. The lightning pulses may be grouped into lightning flashes. The processor device may be communicatively coupled to the lightning detection sensors. The processor device may be configured to track thunderstorm objects. Tracking thunderstorm objects may include assigning the lightning flashes to the thunderstorm objects based on a number of previous lightning flashes assigned to each of the thunderstorm objects and a distance between each of the lightning flashes and each of the thunderstorm objects. Tracking thunderstorm objects may also include determining an updated position of each of the thunderstorm objects based on positions and ages of lightning flashes assigned to each of the thunderstorm objects. The processor device may also be configured to determine a severity of one or more of the thunderstorm objects based on rates, types, and polarities determined from the lightning data for each of the one or more of the thunderstorm objects.

These example embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to detect, forecast, and/or track thunderstorms using lightning data generated by detecting electromagnetic fields (EMF) emitted by lightning discharges. Lightning is the result of charge separation processes that are directly coupled to the updraft, precipitation, and cloud water and ice processes of a thunderstorm. The type of lightning and/or the polarity of lightning flashes occurring within a thunderstorm can be used to determine the severity of a thunderstorm and/or track a thunderstorm.

Lightning may be detected and/or geo-located passively, for example, using remote sensors that may operate at long wavelengths (e.g., longer wavelengths than radar systems). Low frequency (or very low frequency or extremely low frequency) ground based lightning detection sensors may not be subject to terrain blockage issues. In addition, low frequency ground-based lightning detection sensors can be separated by distances greater than those used in a network of radars.

Some methods of determining thunderstorm severity based on lightning data rely exclusively on total lightning flash rate and fail to take into consideration two other characteristics of lightning: lightning type and polarity. Lightning type refers to the difference between cloud-to-ground (CG) return strokes, which contact the ground, and the in-cloud components of lightning (referred to as "cloud pulses") that do not make contact with the ground. Polarity refers to the direction of current or charge flow in the vertical direction, and this reveals some limited information about the organization of electric charges within the thunderstorm that are involved in producing the lightning. The rate of cloud lightning flashes may be linked with the sizes of the flashes, and that both rate and flash size may be associated with the strength of thunderstorm updraft, speed of charge separation, and rapid small-scale rearrangement of charge by turbulence in strong to severe thunderstorms. To date, there does not appear to be any recognition that the mixture of, e.g., cloud pulse polarities, together with the cloud pulse and flash rates, may serve as a proxy indicator of storm strength and possible severity.

Satellite-based lightning detection sensors measure optical pulses from lightning by looking down at the cloud tops S. Goodman, et al., The GOES-R Geostationary Lightning Mapper (GLM), Atmospheric Research, 2013, vol. 125-126, pp. 34-49, which is herein incorporated by reference in its entirety. These optical pulses contain no information that can be used to discern the lightning type or polarity on a pulse-by pulse basis.

Ground-based lightning detection systems operating in the low frequency (LF) to very low frequency (VLF) bands measure signals that do contain information about both polarity and lightning type on a pulse-by-pulse basis. Cloud lightning is almost always more abundant than CG lightning, and it occurs in the part of the thunderstorm where the charge separation process also occurs. Thus, cloud lightning is considered to be more closely linked than CG lightning to the core physical processes in the storm that dictate whether or not the storm can produce severe weather.

However, ground-based lightning detection systems operating at LF to VLF have historically had difficulty detecting a high percentage of cloud lightning because the LF signals from cloud pulses are typically much weaker than those of CG strokes. Thus, much of the existing literature uses lightning detection systems that operate in the VHF (30-300 MHz). Such systems may be capable of detecting nearly all cloud lightning flashes as well as VHF signals generated by CG flashes. However, as with radar, VHF signals suffer from terrain blockage, and like optical signals, they contain no information about lightning type on a pulse-by-pulse basis and no information at all about polarity.

In recent years, ground-based LF lightning detection systems have experienced significant advances in the ability to detect cloud lightning. Lightning detection systems that include, e.g., lightning detection sensors marketed by VAISALA as LS7002 lightning detection sensors can now detect 60% or more of cloud flashes even when the distances between neighboring sensors are 250 kilometers (km) or more. Lightning detection systems that include VAISALA LS7002 lightning detection sensors may be referred to as VAISALA LS7002 networks.

The LF band carries with it both the polarity information and the necessary information to discriminate between cloud pulses and CG return strokes on a pulse-by-pulse basis. Polarity can easily be measured accurately by any LF lightning detection system, but the correct discrimination of lightning type is a much more difficult problem. To date, VAISALA LS7002 networks are the only ground-based lightning detection systems that have demonstrated a discrimination accuracy of around 90%.

Embodiments described herein may take advantage of, e.g., LF and/or VLF lightning detection systems, such as VAISALA LS7002 networks, with relatively high lightning type discrimination accuracy. Such LF and/or VLF lightning detection systems may additionally measure pulse polarities. In these and other embodiments, such LF and/or VLF lightning detection systems may measure a large fraction of cloud lightning flashes and correctly discriminate the vast majority of cloud pulses and CG return strokes, in addition to measuring their polarities.

Accordingly, embodiments described herein may use lightning data such as two or more of flash rate, cloud pulse rate, CG return stroke rate, polarity, and/or type to determine severity of thunderstorms, instead of relying exclusively on flash rate. Such lightning data may be generated using ground-based lightning detection systems such as described with respect to FIG. 1, which may include VAISALA LS7002 network or other suitable lightning detection system and/or satellite-based optical detection systems. By additionally using lightning polarity and/or lightning type in determining severity of thunderstorms, as opposed to relying exclusively or primarily on flash rate, embodiments described herein may improve probability of detection of severe thunderstorms, may reduce a false alarm rate, and/or may otherwise improve detection of severe thunderstorms.

Figure 1:
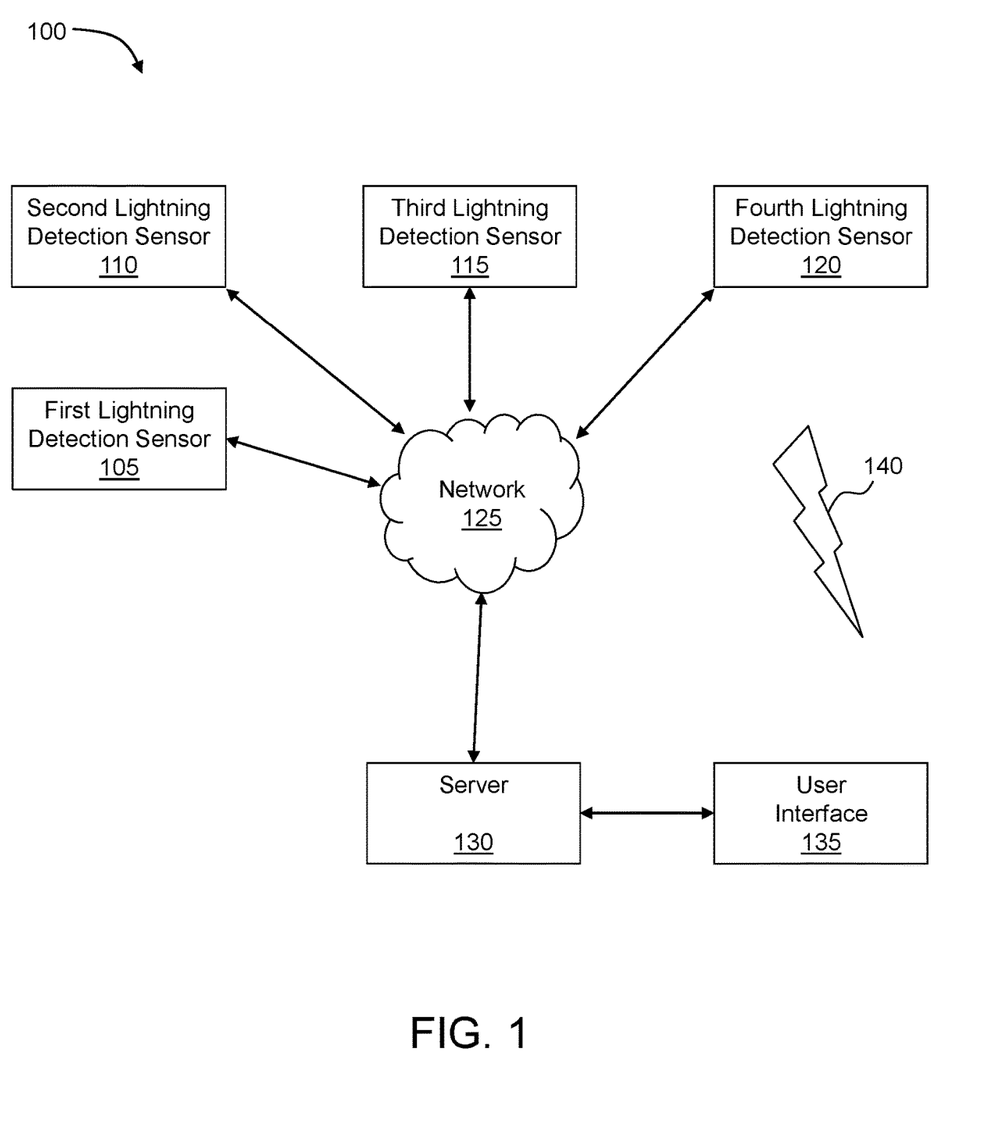
FIG. 1 is an example lightning detection system.

FIG. 1 is an example lightning detection system 100 (hereinafter "system 100"), arranged in accordance with at least one embodiment. In some embodiments, the lightning detection system 100 may include a plurality of lightning detection sensors: a first lightning detection sensor 105, a second lightning detection sensor 110, a third lightning detection sensor 115, and a fourth lightning detection sensor 120 (collectively referred to as lightning detection sensors). While four lightning detection sensors 105, 110, 115, 120 are shown in FIG. 1, more generally the system 100 may include any number of lightning detection sensors. For example, the system 100 may include two or more lightning detection sensors.

The lightning detection system 100 may also include a network 125, a server 130, and/or one or more user interface devices 135. Although illustrated as discrete blocks, various blocks may be divided into additional blocks, combined into fewer blocks, or eliminated, depending on the desired implementation.

Each of the lightning detection sensors 105, 110, 115, and/or 120 may include any type of lightning detection sensor such as, for example, a VAISALA LS7002 lightning detection sensor or a similar lightning detection sensor. In some embodiments, one or more of the lightning detection sensors 105, 110, 115, and/or 120 may include the lightning detection sensor 200 of FIG. 2. In some embodiments, one or more of the lightning detection sensors 105, 110, 115, and/or 120 may include one or more components of the lightning detection sensor 200 of FIG. 2.

The lightning detection sensors 105, 110, 115, and/or 120, for example, may be distributed throughout an environmental space to generate data about one or more lightning sources 140. A single lightning source 140 is depicted in FIG. 1 for simplicity. The lightning source 140 may include a discharge with movement of charge in the earth's atmosphere or between the atmosphere and earth, and which generates or emits electromagnetic (EMF) emissions, referred to as lightning pulses, that may be detected by the lightning detection sensors 105, 110, 115, 120. The lightning source 140 may include a cloud-to-ground (CG) lightning discharge, or an in-cloud (IC) lightning discharge. A CG lightning discharge may include an electrical discharge between a cloud and the ground. An IC lightning discharge may include an electrical discharge within a cloud, referred to as an intracloud lightning discharge, an electrical discharge between two clouds, referred to as a cloud-to-cloud (CC) lightning discharge, or an electrical discharge between a cloud and the air, referred to as a cloud-to-air lightning discharge. The lightning pulses emitted by CG lightning discharges may be referred to as CG return strokes, or simply CG strokes. The lightning pulses emitted by IC lightning discharges that do not reach ground may be referred to as cloud pulses.

The lightning source 140 may emit a lightning pulse, multiple lightning pulses, and/or other lightning emissions that may be detected by the lightning detection sensors 105, 110, 115, and/or 120. A lightning pulse may have a duration on the order of a few microseconds (μs) or more, depending on how "pulse" is defined. The lightning pulses may be grouped into lightning flashes using any suitable algorithm, such as the algorithm described in M. J. Murphy et al., Cloud Lightning Performance and Climatology of the U.S. Based on the Upgraded U.S. National Lightning Detection Network, Seventh Conf. on Meteorological Applications of Lightning Data, Amer. Meteorol. Soc. (2015), which is herein incorporated by reference in its entirety. A lightning flash may have a duration of, e.g., a hundred milliseconds (ms) or more and may be made up of multiple lightning pulses.

Lightning pulses and lightning flashes may each have a type and a polarity. For instance, the type of each lightning pulse may be cloud pulse or CG stroke, while the type of each lightning flash may be cloud flash or CG flash. Any lightning pulse emitted by a lightning discharge that does not reach ground may be categorized as a cloud pulse. Any lightning pulse emitted by a lightning discharge that reaches ground may be categorized as a CG stroke. The type of each of the lightning pulses and the lightning flashes may be determined from lightning data generated by the lightning detection sensors 105, 110, 115, and/or 120 responsive to detecting the lightning pulses and/or flashes. For instance, a shape of a plot of a time-varying voltage detected for a lightning pulse, or other information in or derived from lightning data generated for the lightning pulse, may be used to determine the type of each lightning pulse.

The type of each lightning flash may be determined based on the types of the lightning pulses included in each lightning flash. For instance, any flash that includes at least one CG stroke, while also potentially including one or more cloud pulses, may be determined to be a CG flash. Any flash that includes cloud pulses without any CG strokes may be determined to be a cloud flash, also referred to as a pure IC flash.

The polarity of each lightning pulse and lightning flash may be positive or negative and, at least in the case of lightning pulses, may indicate the direction of flow of charges in the corresponding lightning source 140. The polarity of each of the lightning pulses and the lightning flashes may be determined from lightning data generated by the lightning detection sensors 105, 110, 115, and/or 120 responsive to detecting the lightning pulses and/or flashes. For instance, a sign of an initial electric field change of a time-varying voltage detected for a lightning pulse, or other information in or derived from lightning data generated for the lightning pulse, may be used to determine the polarity of each lightning pulse.

Alternatively or additionally, the polarity of a lightning flash may be determined based on, e.g., the polarity of a particular pulse included in the lightning flash. For instance, in the case of a CG flash, the polarity of the first (e.g., oldest) CG stroke of the CG flash may be assigned as the polarity of the CG flash, even if the CG flash has one or more older cloud pulses. As another example, in the case of a cloud flash or pure IC flash, the polarity of the first (or oldest) cloud pulse of the cloud flash may be assigned as the polarity of the cloud flash or pure IC flash. In other embodiments, the polarity of a lightning flash may be determined in some other manner.

In some embodiments, the lightning detection sensors 105, 110, 115, and/or 120 may detect lightning sources 140 at long ranges such as, for example, ranges greater than 500 km, 1000 km, 1500 km, 1750 km, etc. The lightning sources 140 may be detected based on lightning pulses emitted by the lightning sources 140 and received by the lightning detection sensors 105, 110, 115, and/or 120.

In some embodiments, the lightning detection sensors 105, 110, 115, and/or 120 may detect low frequency lightning pulses emitted by the lightning sources 140. Typically, two, three, or four of the lightning detection sensors 105, 110, 115, and/or 120 may detect a lightning pulse generated from a single lightning flash. In some embodiments, one or more of the lightning detection sensors 105, 110, 115, and/or 120 may detect time domain, low frequency lightning pulses that may have (and/or whose data may have), for example, a specific shape, a specific time of arrival, and/or a specific direction of arrival from the one or more lightning sources 140. In some embodiments, the lightning detection sensors 105, 110, 115, and/or 120 may provide geolocation capabilities to the server 130 via the network 125 that specify the geolocation of the respective lightning detection sensor 105, 110, 115, or 120.

In some embodiments, the lightning detection sensors 105, 110, 115, and/or 120 may generate lightning data from a detected lightning pulse. The lightning data, for example, may include time-varying voltage or other time-varying measurements of the detected lightning pulse, the timing of when the lightning pulse is detected, the magnitude of the lightning pulse, the polarity of the lightning pulse, the type of lightning pulse, GPS data associated with the lightning detection sensor, angle or direction of arrival data, data from which one or more of the foregoing may be determined or derived, or other lightning data.

In some embodiments, the network 125 may connect the lightning detection sensors 105, 110, 115, and/or 120 to the server 130. In some embodiments, the network 125 may be a wireless network that includes one or more wireless networks, such as, for example a wireless LAN, a cellular network, a LTE network, a CDMA network, a GSM network, a microwave network, a long range Wi-Fi network, a satellite network, or other suitable network. In some embodiments, the network 125 may include a wired LAN or Ethernet connection, or other wired connections for serial or parallel data transmission from the lightning detection sensors 105, 110, 115, and/or 120 to the server 130. In some embodiments, the network 125 may include both wireless and wired components. For example, the lightning detection sensors 105, 110, 115, and/or 120 may be communicatively coupled with a wireless network and the server may be communicatively coupled with the wireless network via a wired connection.

In some embodiments, the server 130 may include one or more components of computational system 500. In some embodiments, the server 130 may include one or more servers located in one or more locations and/or located at various distributed locations (e.g., a cloud server).

In some embodiments, the server 130 may receive lightning data from all or some of the lightning detection sensors 105, 110, 115, and 120 via the network 125. In some embodiments, the server 130 may include a database where the lightning data received from the lightning detection sensors 105, 110, 115, and/or 120 may be stored.

In some embodiments, the server 130 may include a processor (or one or more processors) programmed to process and/or analyze the lightning data received from the lightning detection sensors 105, 110, 115, and/or 120 and/or stored in a database of the server 130.

In some embodiments, the server 130 may geolocate (e.g., determine a position of) lightning sources 140, or locations of origin of the corresponding lightning pulses, based on the lightning data received from the lightning detection sensors 105, 110, 115, and/or 120. For instance, the server 130 may be configured to determine a position of the lightning source 140, e.g., using a time difference of arrival (TDOA) or triangulation method based on GPS or other position data and timing data included in the lightning data received from the lightning detection sensors 105, 110, 115, and/or 120. Such methods may consider the time of arrival of the same lightning pulse emitted by the lightning source 140 at two or more of the lightning detection sensors 105, 110, 115, and/or 120, locations of the two or more of the lightning detection sensors 105, 110, 115, and/or 120, and/or angle/direction data. Alternatively or additionally, the server 130 may determine a time of occurrence of the lightning source 140, or times of occurrence of emission of the corresponding lightning pulses, based on the lightning data received from the lightning detection sensors 105, 110, 115, and/or 120. Alternatively or additionally, the server 130 may group lightning pulses into lightning flashes, may determine types and/or polarities of each lightning pulse and/or lightning flash, may track thunderstorms, may forecast future locations of thunderstorms, and/or may determine severity of thunderstorms, all of which are described in more detail elsewhere herein. In these and other embodiments, the server 130 may execute, perform, or control performance of one or more of the methods or operations described herein.

In some embodiments, the user interface device 135 may include any device that can access data stored at the server 130 such as, for example, a computer, a laptop, a smartphone, a tablet, or other suitable device. In some embodiments, the user interface device 135 may be used to retrieve and/or present the lightning data from the lightning detection sensors 105, 110, 115, and/or 120, or other measurements and information such as the polarity information, type of lightning flashes, to a user.

Figure 2:
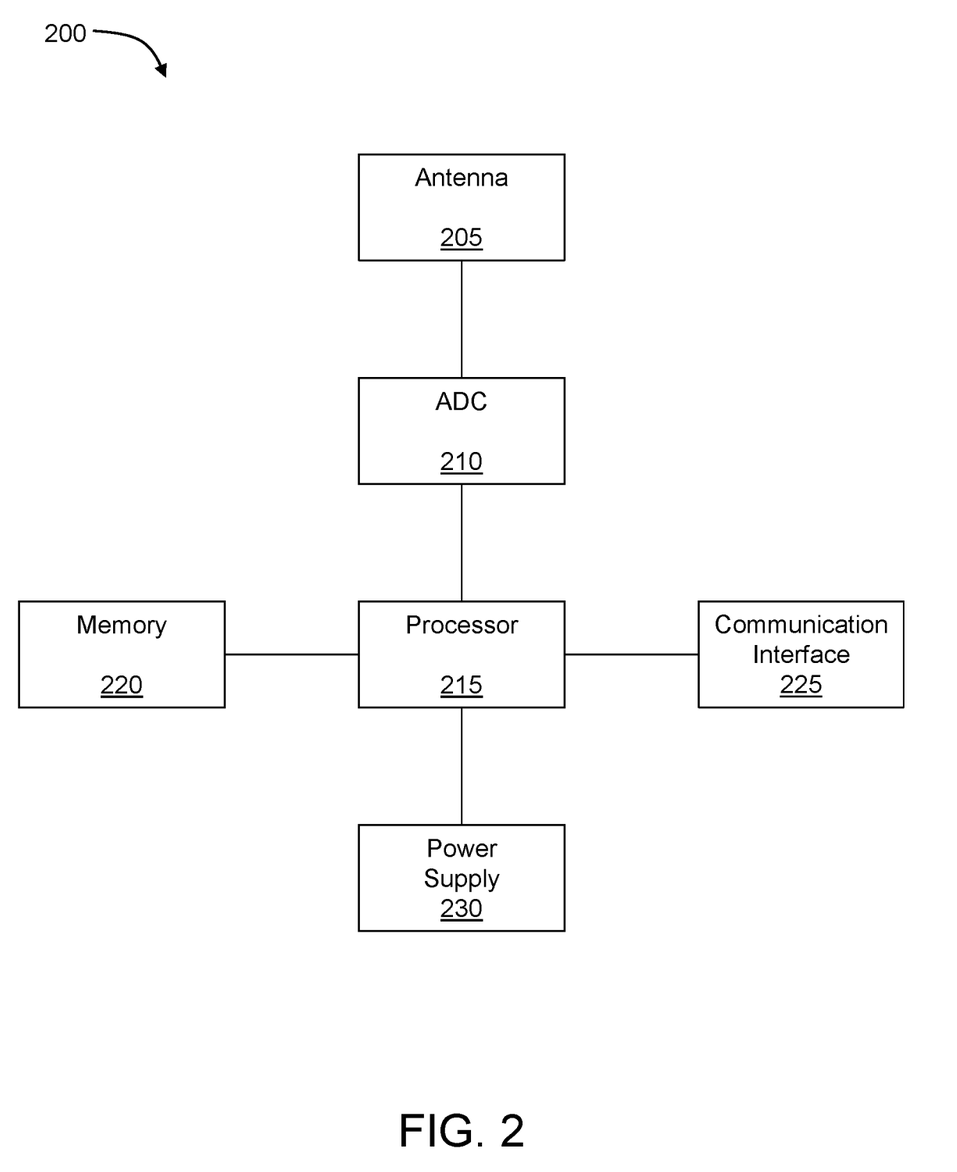
FIG. 2 is an example lightning detection sensor.

FIG. 2 is an example lightning detection sensor 200, arranged in accordance with at least one embodiment described herein. The lightning detection sensor 200 may include or correspond to one or more of the lightning detection sensors 105, 110, 115, and/or 120 of FIG. 1. In at least one embodiment, the lightning detection sensor 200 may include an antenna 205, an analog-to-digital converter (ADC) 210, a processor 215, memory 220, a communication interface 225, and/or a power supply 230. Various other components may also be included.

In some embodiments, the lightning detection sensor 200 may, for example, detect lightning pulses emitted by lightning discharges of a thunderstorm in an environmental space and/or may measure different characteristics of the lightning pulses. For example, the lightning detection sensor 200 may receive and detect at the antenna 205 lightning pulses at one or more of low frequency (LF), very low frequency (VLF), and/or ultra low frequency (ULF). LF may include frequencies in the range 30 kilohertz (kHz) to 300 kHz. VLF may include frequencies in the range 3 kHz to 30 kHz. ULF may include frequencies in the range 0.3 kHz to 3 kHz. In other embodiments, the lightning detection sensor 200 may receive and detect at the antenna 205 lightning pulses at other frequencies instead of or in addition to the foregoing range of detection frequencies. For instance, the detection frequencies may extend at least partially into medium frequency (MF) (300 kHz to 3 MHz). The antenna 205 may output, for each detected lightning pulse, an analog signal that represents the lightning pulse.

In some embodiments, the ADC 210 may convert the received analog signal for each lightning pulse into a digital signal or digital data. The digital signal or data may include a digital representation of the lightning pulse. The digital signal or data, for example, may be stored by the processor 215 in the memory 220. The digital signal or data, for example, may be communicated to an external device, for example, the server 130, via the communication interface 225, as lightning data.

In some embodiments, the processor 215 may process the digital signal or data to determine a polarity of the associated lightning pulse and/or a type of the associated lightning pulse. In some embodiments, the processor 215 may include one or more components of computational system 500. In some embodiments, the processor 215 may include one or more servers located in one or more locations and/or located at various distributed locations. Although the processing of the lightning data, and in particular the digital signal or data, to determine a type and polarity of the associated lightning pulse is described as being performed by the processor 215 at the lightning detection sensor 200, in other embodiments, the processing may be performed remotely, e.g., at the server 130 of FIG. 1. The processor 215 may more generally include any include suitable processing device, such as a processor, a microprocessor, a controller, a microcontroller, a field programmable gate array (FPGA), an application specific integrated circuit (ASIC), a digital signal processor (DSP) or other suitable processing device.

In some embodiments, the memory 220 may include a disk drive, a drive array, an optical storage device, a solid-state storage device, such as random access memory ("RAM") and/or read-only memory ("ROM"), which can be programmable, flash-updateable, and/or the like.

In some embodiments, the communication interface 225 may include a modem, a network card (wireless or wired), an infrared communication device, a wireless communication device, and/or wireless communication chipset. In some embodiments, the communication interface 225 may communicate with a wireless network such as, for example, a wireless LAN, a cellular network, a LTE network, a CDMA network, a GSM network, a microwave network, a long range Wi-Fi network, a satellite network, and/or other suitable network. The communication interface 225 may transmit data such as, for example, lightning data, to the server 130 (or another device) via the network 125 (or other network).

In some embodiments, the lightning detection sensor 200 may be mounted on a concrete ground pad, while in other embodiments, the lightning detection sensor 200 may also include non-ground mounting options. The lightning detection sensor 200 can be used to perform and/or control operation of one or more of the methods or operations of any of the embodiments described herein. For example, the lightning detection sensor 200 can be used to perform any calculation, solve any equation, perform any identification, and/or make any determination described here.

Although illustrated as discrete blocks, various blocks may be divided into additional blocks, combined into fewer blocks, or eliminated, depending on the desired implementation.

In some embodiments, the lightning detection sensor 200 may include either a DC or an AC power supply 230.

Some embodiments described herein relate to methods to track, forecast, and/or determine severity of thunderstorms. The foregoing methods and/or embodiments thereof may be implemented individually and/or in any combination of two or more. Each will be discussed in turn.

To date, existing methods of using lightning information (e.g., information generated by a lightning detection system) to track thunderstorms involve accumulating some information about the density of lightning flashes over a spatial grid and over some period of time, e.g., number of flashes/$km^2$/5 minutes. This is essentially a radar-like means of tracking thunderstorms with lightning observations. By contrast, embodiments described herein recognize that the initial cloud pulses and CG strokes of lightning flashes tend to be clustered near the cores of thunderstorms, and these may be assigned to thunderstorm tracks on an almost interrupt-driven basis.

One of the pitfalls of quasi-continuous tracking by addition of new lightning flashes is that the resulting thunderstorm tracks can be somewhat irregular and not smooth, as real thunderstorm tracks typically are. To alleviate this issue to some degree, some embodiments described herein have also recognized that it is possible to apply an age-based time weighting to the process of determining the center of mass of each thunderstorm as new lightning flashes are added to it and older flashes are allowed to age out.

Figure 3:
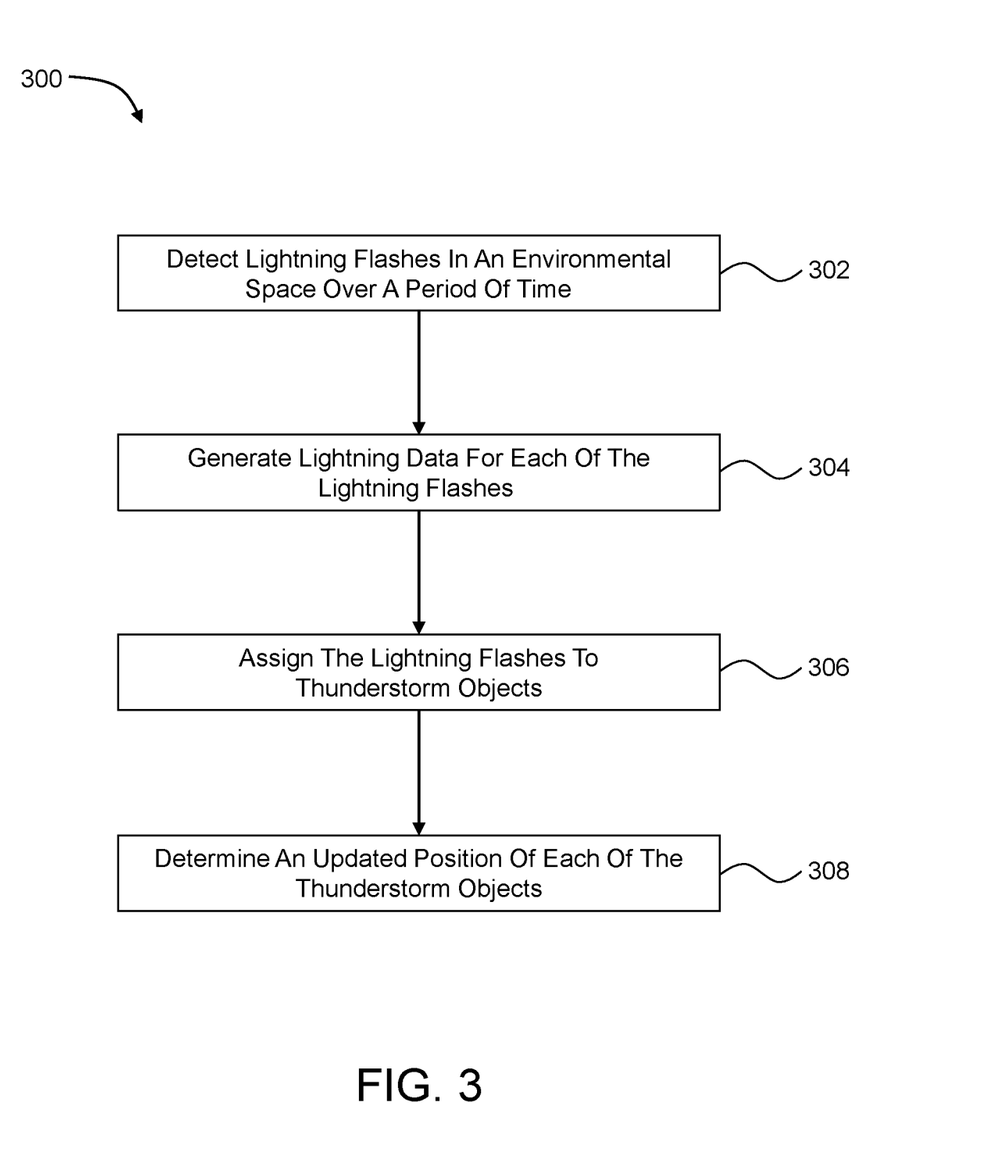
FIG. 3 is a flowchart of an example method to track thunderstorms.

In more detail, FIG. 3 is a flowchart of an example method 300 to track thunderstorms, arranged in accordance with at least one embodiment described herein. The method 300 may be performed, in whole or in part, in the system 100 of FIG. 1, the lightning detection sensor 200 of FIG. 2, and/or in other systems, devices, and/or configurations. Alternatively or additionally, some or all of the method 300 may be controller by a computer or processor device, such as the server 130 of FIG. 1 and/or the processor 215 of FIG. 2. The method 300 may include one or more of blocks 302, 304, 306, and/or 308. The method 300 may begin at block 302.

In block 302, lightning flashes may be detected in an environmental space over a period of time using lightning detection sensors, such as any of the lightning detection sensors of FIG. 1 or FIG. 2. In some embodiments, detecting lightning flashes may include detecting lightning pulses and grouping the lightning pulses into lightning flashes, e.g., by a processor or a server. Block 302 may be followed by block 304.

In block 304, lightning data may be generated for each of the lightning flashes. The generated lightning data may include both a position and a time for each of the lightning flashes. In an example, the generated lightning data is generated by, e.g., the server 130 of FIG. 1 or the processor 215 of FIG. 2 using the lightning data output by two or more of the lightning detection sensors 105, 110, 115, and/or 120 of FIG. 1 and/or output by the ADC 210 of FIG. 2. The position and time of each lightning flash may include a location and time of a first (e.g., oldest) cloud pulse of the lightning flash in the case of a cloud flash (e.g., pure IC flash) or a location and time of a first (e.g., oldest) CG stroke of the lightning flash in the case of a CG flash. Block 304 may be followed by block 306.

In block 306, the lightning flashes may be assigned to thunderstorm objects (or thunderstorm cores) based on numbers of previous lightning flashes assigned to each thunderstorm object and distances between each lightning flash and each thunderstorm object. The lightning flashes may be assigned to thunderstorm objects in real-time, near real-time, on an interrupt-driven basis, or quasi interrupt-driven basis. In this and other embodiments, the method 300 of FIG. 3 may attempt to minimize the fracturing of thunderstorm objects into multiple fragments by "attracting" a new lightning flash toward existing thunderstorm objects with a "force" that is proportional to the number of lightning flashes already in each thunderstorm object divided by the square of the distance between the new lightning flash and the existing thunderstorm object. Essentially, each existing thunderstorm object acts as a "mass", as in Newton's law of universal gravitation. For this reason, the method 300 may be referred to as, e.g., a "gravitational" thunderstorm tracking algorithm. The method 300 may place a maximum distance limit on each thunderstorm object's "force", so that overclustering does not take place.

In some embodiments, the method 300 may place a direction-dependent maximum distance limit on each thunderstorm object's force, to the degree that the thunderstorm object's motion is sufficiently well resolved. For instance, if the thunderstorm object's motion is relatively consistent over time with a velocity greater than a threshold velocity (e.g., at least 15 km/hr), the maximum distance limit in a downstream direction (or current direction) of the thunderstorm object's motion may be increased while the maximum distance limit in an upstream direction (or direction opposite the current direction) may be decreased.

Accordingly, in an example embodiment, for each new lightning flash within the maximum distance limit of one or more thunderstorm objects, block 306 may include calculating the "force" of each thunderstorm object on each lightning flash as the number of lightning flashes already in each of the thunderstorm objects divided by the square of the corresponding distance between the new lightning flash and the thunderstorm object. Each new lightning flash may be assigned to the corresponding thunderstorm object associated with the highest "force" calculation.

For instance, consider a new lightning flash located 25 km from a first thunderstorm object with twenty-two lightning flashes and located 10 km from a second thunderstorm object with five lightning flashes. The "force" calculation associated with the first thunderstorm object is $22/(25^2)$ =0.0352 and the "force" calculation associated with the second thunderstorm object is $5/(10^2)$=0.05. Since 0.05 is larger than 0.0352, the new lightning flash may be assigned to the second thunderstorm object. Block 306 may be followed by block 308.

In block 308, an updated position of each of the thunderstorm objects may be determined based on, e.g., positions and ages of the lightning flashes assigned to the thunderstorm objects. The age of each lightning flash may refer to an elapsed time since the time (e.g., the occurrence time) of the newest lightning flash.

Figure 4:
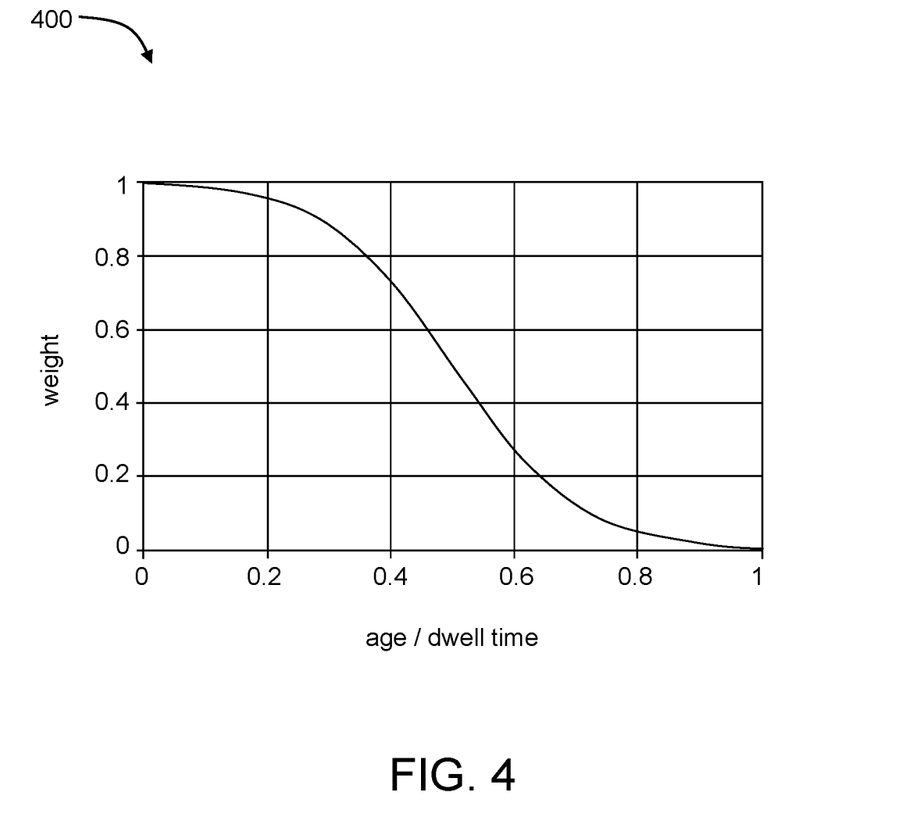
FIG. 4 includes a graph of an example weighting function or factor which may be used to weight positions of lightning flashes.

In this and other embodiments, lightning discharges may undergo a random walk within the thunderstorm objects. This can make it difficult to track the mean position, centroid, or other representation of location of the thunderstorm objects in a reliable fashion, especially if a recent history of where the thunderstorm object has been is lost too quickly. For this reason, an embodiment of the method 300 may preserve a recent history of the corresponding lightning flashes added to each thunderstorm object over a period of time referred to as a "dwell time". The dwell time has a duration of 10 minutes in an example implementation. At regular intervals that are shorter than the dwell time, called "update intervals", the positions of each thunderstorm object (e.g., a mean position or centroid position) may be updated (e.g., in block 308) by calculating a weighted average of the positions of the lightning flashes that are in the recent history list. The regular update interval may have a duration of 0.5 to 1 minute in an example. The weight given to each lightning flash may be a function of its age, as shown in FIG. 4. The newest lightning flashes may receive the greatest weight, and the weight may smoothly drop to zero as the lightning flash age approaches the dwell time. The weighted averaging may be designed to enforce smoothness and continuity on the mean thunderstorm object positions so that, as a history of these thunderstorm object positions accumulates, thunderstorm object velocity vectors used for forecasting may also be estimated with decent reliability.

FIG. 4 includes a graph 400 of an example weighting function or factor which may be used to weight positions of lightning flashes as just discussed, arranged in accordance with at least one embodiment described herein. As illustrated, the weighting function of FIG. 4 inversely depends on the age of a corresponding lightning flash, or elapsed time since the corresponding lightning flash occurred. The weighting function of FIG. 4 drops to zero when the age of the lightning flashes reaches the dwell time, effectively aging out all lightning flashes that have an age greater than or equal to the dwell time such that relatively old lightning flashes (e.g., older than or equal to the dwell time) do not contribute to the calculation of the updated position of the corresponding thunderstorm object.

The method 300 may be repeated one or more times, e.g., once at each update interval, with the outputs, determinations, and/or calculations from one iteration being used in one or more subsequent iterations. For instance, the lightning flashes newly assigned to a thunderstorm object in one iteration may be considered as previously assigned lightning flashes in a subsequent iteration. Analogously, the updated position of a thunderstorm object determined in one iteration may be used as the most recent position of the thunderstorm object in the next iteration, e.g., when determining the distance between the thunderstorm object and new lightning flashes that are being assigned to thunderstorm objects.

For this and other procedures and methods disclosed herein, the functions or operations performed in the processes and methods may be implemented in differing order. Furthermore, the outlined operations are only provided as examples, and some of the operations may be optional, combined into fewer operations, supplemented with other operations, or expanded into additional operations without detracting from the disclosed embodiments.

One or more outputs of the method 300 to track thunderstorms may be used to forecast future locations of thunderstorms and/or to determine severity of thunderstorms. For instance, the method 300 may further include forecasting a future position of a thunderstorm object based at least on an updated position of the thunderstorm object. Virtually any thunderstorm forecasting algorithm may be implemented and may use as input the updated position and/or a track (e.g., a series of positions over time) output by, e.g., the method 300 of FIG. 3.

Figure 5:
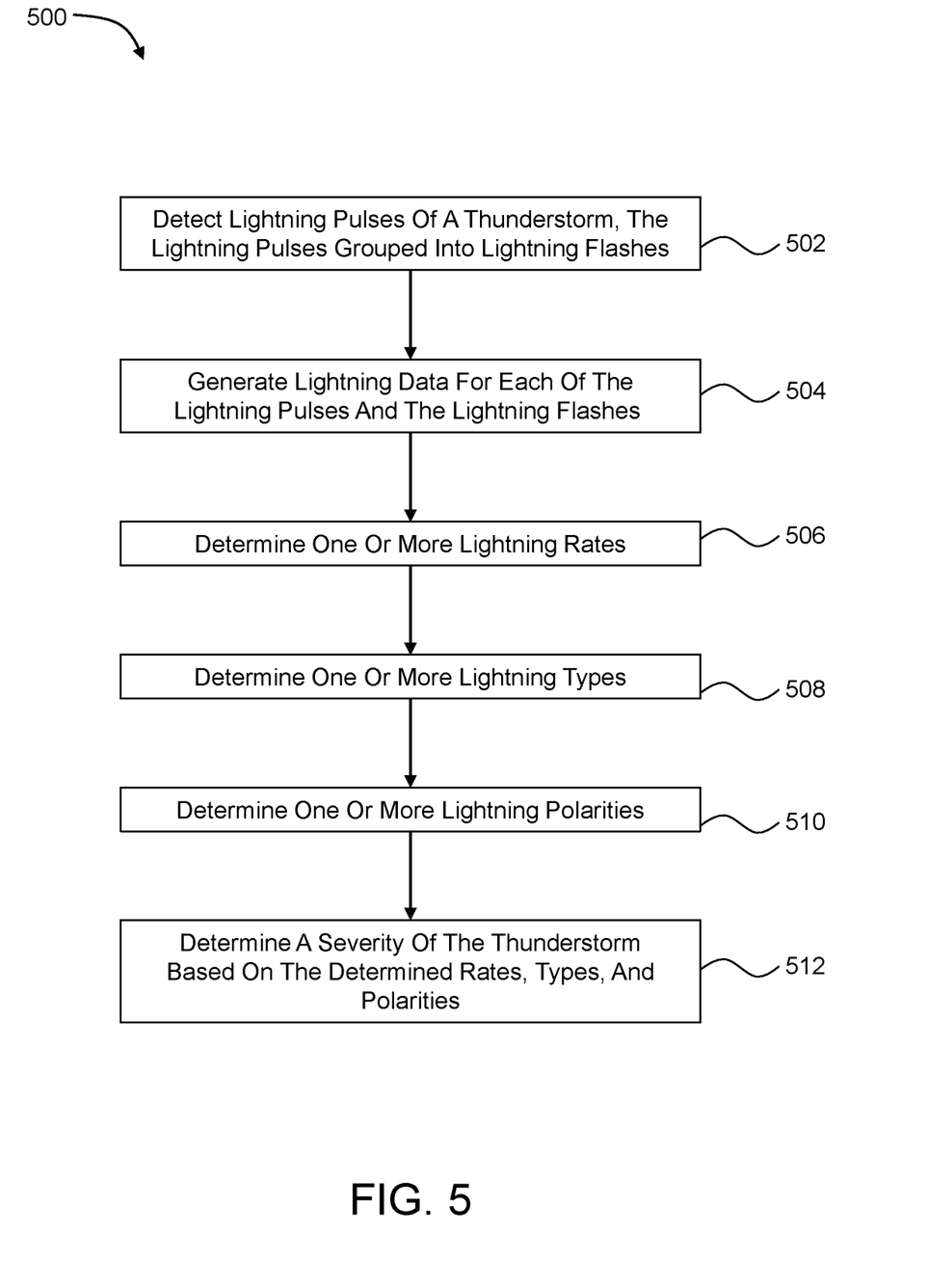
FIG. 5 is a flowchart of an example method to determine severity of a thunderstorm.

FIG. 5 is a flowchart of an example method 500 to determine severity of a thunderstorm, arranged in accordance with at least one embodiment described herein. The method 500 may be performed, in whole or in part, in the system 100 of FIG. 1, the lightning detection sensor 200 of FIG. 2, and/or in other systems, devices, and/or configurations. Alternatively or additionally, some or all of the method 500 may be controller by a computer or processor device, such as the server 130 of FIG. 1 and/or the processor 215 of FIG. 2. The method 500 may include one or more of blocks 502, 504, 506, 508, 510, and/or 512. The method 500 may begin at block 502.

In block 502, lightning pulses emitted by a thunderstorm object in an environmental space may be detected by lightning detection sensors. The lightning pulses may be grouped into lightning flashes, e.g., using any suitable algorithm. The lightning pulses may be detected by, e.g., the antenna 205 of FIG. 2 generating an analog signal representative of each lightning pulse received at the antenna 205. Block 502 may additionally include detecting the lightning flashes, such as by grouping the detected lightning pulses into lightning flashes.

In block 504, lightning data may be generated for each of the lightning pulses and the lightning flashes detected at block 502. The generated lightning data may include, e.g., the digital signal output by the ADC 210 of FIG. 2 for each of the lightning pulses and/or data derived therefrom, such as a position and/or time of the corresponding lightning pulse or lightning discharge from which the lightning pulse is emitted.

Alternatively or additionally, the method 500 may include tracking a thunderstorm object and/or multiple thunderstorm objects. The tracking may be implemented according to any suitable tracking algorithm, such as the method 300 of FIG. 3. The operations and/or blocks of FIG. 5 are described as being performed with respect to the lightning pulses and/or lightning flashes of a single thunderstorm object for simplicity, but may be replicated, as needed, to determine the severity of any number of thunderstorm objects. Block 504 may be followed by block 506.

In block 506, one or more lightning rates may be determined from the lightning data. The one or more lightning rates may include one or more flash rates and/or one or more pulse rates. For instance, one or more flash rates of the lightning flashes may be determined. The one or more flash rates may include a total flash rate, a CG flash rate, and/or a cloud (or pure IC) flash rate. Each of the foregoing flash rates may be or include the corresponding flash rate of a single thunderstorm object. The total flash rate may include a count of all lightning flashes of the thunderstorm object in a given time period, such as total flashes per minute. The CG flash rate may include a count of all CG flashes of the thunderstorm object in a given time period. The cloud flash rate may include a count of all cloud flashes of the thunderstorm object in a given time period.

Alternatively or additionally, one or more pulse rates may be determined from the lightning data in block 506. The one or more pulse rates may include a total pulse rate, a CG stroke rate, and/or a cloud pulse rate. Each of the foregoing pulse rates may be or include the corresponding pulse rate of a single thunderstorm object. The total pulse rate may include a count of all lightning pulses of the thunderstorm object in a given time period. The CG stroke rate may include a count of all CG strokes of the thunderstorm object in a given time period. The cloud pulse rate may include a count of all cloud pulses of the thunderstorm object in a given time period. Block 506 may be followed by block 508.

In block 508, one or more lightning types may be determined from the lightning data. The one or more lightning types may include flash type and/or pulse type. The flash types may include CG flash and cloud (or pure IC) flash, while the pulse types may include CG stroke and cloud pulse. For instance, at block 508, each of the lightning pulses may be determined to be either a cloud pulse or a CG stroke, while each of the lightning flashes may be determined to be either a cloud flash or a CG flash. A shape of a plot of a time-varying voltage detected for each lightning pulse, or other information in or derived from the lightning data for a given lightning pulse, may be used to determine whether each pulse is a cloud pulse or a CG stroke. The type of each lightning flash may be determined based on whether a given lightning flash includes any CG strokes, e.g., CG flash if yes, cloud flash if no. Block 508 may be followed by block 510.

In block 510, one or more lightning polarities may be determined from the lightning data. The one or more lightning polarities may include flash polarity and/or pulse polarity. Each of the flash polarities and pulse polarities may include positive polarity and negative polarity. For instance, the sign of an initial electric field change, or other information in or derived from the lightning data for a given lightning pulse, may be used to determine whether each pulse has a positive polarity or a negative polarity. The polarity of a lightning flash may be determined based on, e.g., the polarity of a particular pulse included in the lightning flash. For instance, in the case of a CG flash, the polarity of the first (e.g., oldest) CG stroke of the CG flash may be assigned as the polarity of the CG flash, even if the CG flash has one or more older cloud pulses. As another example, in the case of a cloud flash or pure IC flash, the polarity of the first (or oldest) cloud pulse of the cloud flash may be assigned as the polarity of the cloud flash or pure IC flash. Block 510 may be followed by block 512.

The polarity of a lightning flash, for example, may be used to determine some information about the organization of the electric charges within the thunderstorm object that are involved in producing the lightning flashes. For example, the presence of positively polarized lightning flashes or an increasing presence of positively polarized lightning flashes within a thunderstorm may indicate that a thunderstorm may be dissipating.

In block 512, a severity of the thunderstorm may be determined based on the determined rates, types, and/or polarities. Determining the severity based on the determined rates, types, and/or polarities may include determining the severity based directly on the determined rates, types, and/or polarities and/or based on quantities or parameters derived therefrom.

In some embodiments, the severity determination in block 512 is a binary determination, e.g., the thunderstorm is determine to be either severe or not severe and may be based on rates, types, and/or polarities included in or derived from the lightning data. Some algorithms to determine severity based on lightning data use only the flash rate or time rate of change of the flash rate to determine the severity. Such algorithms rely on total flash rate or rapid increases in total flash rate as indicators of severity. An example algorithm defines a flash rate criterion as a two-minute interval of time in which a time rate of change of a total flash rate of a thunderstorm object is at least two standard deviations above a weighted, running average of the time rate of change of the total flash rate during a preceding 10 minutes. A variation of the preceding algorithm dispenses with the weighted smoothing and adds a minimum total flash rate to the flash rate criterion, the variation of the flash rate criterion being defined as a two-minute interval in which a time rate of change of the total flash rate is at least two standard deviations above the average of the time rate of change of the total flash rate during the preceding 10 minutes and the total flash rate being at least 10 flashes per minute. See C. Schultz et al., Lightning and Severe Weather: A Comparison between Total and Cloud-to-ground Lightning Trends, *Weather and Forecasting*, vol. 26, pp 744-755 (2011), which is incorporated herein by reference in its entirety.

In these and other algorithms to determine thunderstorm severity based on lightning data, a thunderstorm object with lightning data that satisfies the flash rate criterion may be determined to be a severe thunderstorm, while a thunderstorm object with lightning data that fails to satisfy the flash rate criterion may be determined to not be a severe thunderstorm. In addition, such algorithms to determine thunderstorm severity based on lightning data fail to take into consideration two other characteristics of lightning that may be included in or derived from lightning data, namely, type and polarity. Embodiments described herein, however, may determine the severity based on the flash rate (and/or pulse rate), the types, and the polarities of lightning pulses and/or flashes of the thunderstorm.

As an example, determining the severity of the thunderstorm at block 512 based on the determined rates, types, and polarities may include determining whether the flash rate and/or a time rate of change of the flash rate satisfy a flash rate criterion, determining whether the types and/or polarities satisfy at least a second criterion, and determining that the thunderstorm object is severe or not severe based on whether the flash rate criterion and the second criterion are satisfied. In an embodiment, it may be determined that the thunderstorm object is not severe in response to the total flash rate or the time rate of change of the total flash rate failing to satisfy the flash rate criterion. Alternatively or additionally, it may be determined that the thunderstorm object is severe in response to the total flash rate or the time rate of change of the total flash rate satisfying the flash rate criterion and the types and/or polarities satisfying the second criterion. Alternatively or additionally, it may be determined that the thunderstorm or thunderstorm object is not severe in response to the total flash rate or the time rate of change of the total flash rate satisfying the flash rate criterion and the types and/or polarities failing to satisfy the second criterion.

In an example, the flash rate criterion used in determining the severity of the thunderstorm in block 512 may be the same as or similar to one or more of the flash rate criteria discussed elsewhere. For instance, the flash rate criterion may include the time rate of change of the total flash rate during a two-minute interval being at least two standard deviations above an average of the time rate of change of the total flash rate during a preceding 10 minute interval and the total flash rate being at least 10 flashes per minute.

In an example, the second criterion may include at least one of the following: (1) the total flash rate is at least 30 flashes per two-minute interval and a fraction of cloud flashes among all flashes is at least 0.5 and greater than or equal to a threshold that decreases linearly with increasing total flash rate, (2) a pulse rate of cloud pulses with negative polarity and associated with cloud flashes is greater than or equal to a second threshold that decreases linearly with increasing total flash rate, and/or (3) the total flash rate is at least 55 flashes per two-minute interval.

More generally, the second criterion may include any criterion that includes or is based on rate, type, and/or polarity in virtually any combination. Various specific non-limiting examples follow.

As an example, determining the severity of the thunderstorm at block 512 based on the determined rates, types, and polarities may include determining a flash rate of lightning flashes having a specific flash type, such as a CG flash rate or a cloud flash rate. For instance, the determining at block 512 may include determining a CG flash rate or a cloud flash rate, where the severity of the thunderstorm may depend on the determined CG flash rate or cloud flash rate.

As another example, the determining at block 512 may include determining a pulse rate of lightning pulses having a specific pulse type, such as CG stroke rate or cloud pulse rate. For instance, the determining at block 512 may include determining a CG stroke rate or a cloud pulse rate, where the severity of the thunderstorm may depend on the determined CG stroke rate or cloud pulse rate.

As another example, the determining at block 512 may include determining a ratio of lightning flashes having a specific flash type to a total number of flashes. For instance, the determining at block 512 may include determining a ratio of CG flashes or cloud flashes to a total number of the lightning flashes, where the severity of the thunderstorm may depend on the determined ratio.

As another example, the determining at block 512 may include determining a ratio of lightning flashes having a specific flash type and a specific polarity to a total number of flashes having the specific polarity. For instance, the determining at block 512 may include determining a ratio of positive polarity CG flashes or of negative polarity CG flashes to a total number of CG flashes, where the severity of the thunderstorm may depend on the determined ratio. Alternatively or additionally, the determining at block 512 may include determining a ratio of positive polarity cloud flashes or of negative polarity cloud flashes to a total number of cloud flashes, where the severity of the thunderstorm may depend on the determined ratio.

As another example, the determining at block 512 may include determining a time rate of change of all lightning flashes, or determining a time rate of change of lightning flashes having a specific flash type (e.g., CG flash or cloud flash).

As another example, the determining at block 512 may include determining a flash rate of lightning flashes having a specific polarity, such as positive or negative polarity. For instance, the determining at block 512 may include determining a flash rate of negative polarity lightning flashes or of positive polarity lightning flashes, where the severity of the thunderstorm may depend on the determined flash rate of negative or positive polarity lightning flashes.

As another example, the determining at block 512 may include determining a pulse rate of lightning pulses having a specific type and polarity. For instance, the determining at block 512 may include determining a pulse rate of negative polarity CG strokes or of positive polarity CG strokes, where the severity of the thunderstorm may depend on the determined pulse rate of negative or positive polarity CG strokes. Alternatively or additionally, the determining at block 512 may include determining a pulse rate of negative polarity cloud pulses or of positive polarity cloud pulses, where the severity of the thunderstorm may depend on the determined pulse rate of negative or positive polarity cloud pulses.

As another example, the determining at block 512 may include determining a ratio of lightning flashes having the specific polarity (e.g., positive or negative) to a total number of flashes.

As another example, the determining at block 512 may include determining a time rate of change of the lightning flashes having the specific polarity (e.g., positive or negative).

As another example, the determining at block 512 may include determining a ratio of a specific type of lightning pulses associated with the specific type of lightning flashes to a total number of the specific type of lightning pulses. For instance, the determining at block 512 may include determining a ratio of cloud pulses or CG strokes associated with cloud flashes or CG flashes to a total number of cloud flashes or CG flashes, where the severity of the thunderstorm may depend on the determined ratio.

As another example, the determining at block 512 may include determining a ratio of a specific polarity and type of lightning pulses associated with the specific type of lightning flashes to a total number of the specific type of lightning pulses. For instance, the determining at block 512 may include determining a ratio of negative polarity cloud pulses associated with cloud flashes to a total number of cloud pulses, where the severity of the thunderstorm may depend on the determined ratio.

The determined severity may be used in connection with one or both of the tracking and/or forecasting. For instance, thunderstorms may be tracked with the tracking algorithm, forecasted with a short-term forecasting algorithm, and have their severity determined to provide a warning, notice, and/or forecast to the public, utilities, airports, government officials, and/or other entities in forecasted future locations (and/or surrounding areas) of a severe thunderstorm. For example, the server 130 may send one or more electronic messages or post data to a webpage stating the severity of a thunderstorm and/or the track of the thunderstorm. In some embodiments, the severity metric may be output from the server 130 to the user interface device 135.

Embodiments of the methods described herein may be applied to a database of historical lightning data to determine how well the tracking, forecasting, and/or severity determination methods and operations described herein align with actual historical results. Such lightning data may be stored in a database. Alternatively or additionally, lightning data collected and/or generated as described herein may be added to such a database.

In some embodiments, determining whether an identified thunderstorm is severe may be based on a statistical analysis based on a number of different factors such as, for example, one or more of the pressure, temperature, humidity, wind, the density of lightning flashes, the type of lightning flashes, the polarity of lightning flashes, etc. in addition to one or more of, e.g., the criteria discussed with respect to FIG. 5.

Figure 6:
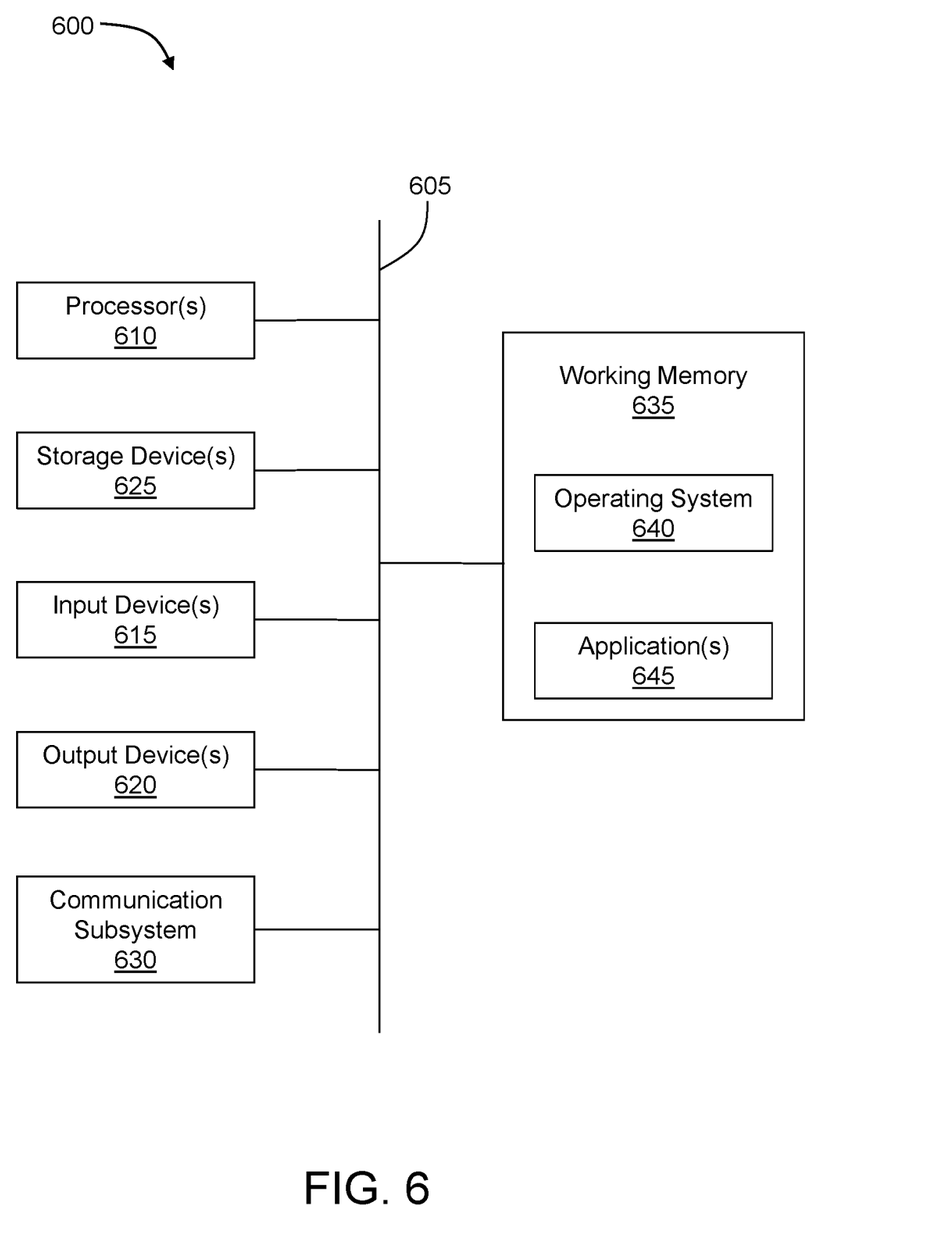
FIG. 6 shows an example computational system, all arranged in accordance with at least one embodiment described herein.

FIG. 6 includes a block diagram of an example computational system 600 (or processing unit), arranged in accordance with at least one embodiments described herein. The computational system 600 can be used to perform and/or control operation of any of the embodiments described herein. For example, the computational system 600 can be used alone or in conjunction with other components. As another example, the computational system 600 can be used to perform any calculation, solve any equation, perform any identification, and/or make any determination described here. The computational system 600 is an example implementation of the server 130 of FIG. 1.

The computational system 600 may include any or all of the hardware elements shown in the figure and described herein. The computational system 600 may include hardware elements that can be electrically coupled via a bus 605 (or may otherwise be in communication, as appropriate). The hardware elements can include one or more processors 610, including one or more general-purpose processors and/or one or more special-purpose processors (such as digital signal processing chips, graphics acceleration chips, and/or the like); one or more input devices 615, which can include a mouse, a keyboard, or other suitable input device; and one or more output devices 620, which can include a display device, a printer, and/or other suitable output device.

The computational system 600 may further include (and/or be in communication with) one or more storage devices 625, which can include local and/or network-accessible storage and/or can include a disk drive, a drive array, an optical storage device, a solid-state storage device, such as random access memory ("RAM") and/or read-only memory ("ROM"), which can be programmable, flash-updateable, and/or the like. The computational system 600 might also include a communications subsystem 630, which can include a modem, a network card (wireless or wired), an infrared communication device, a wireless communication device, and/or chipset (such as a Bluetooth® device, a 802.6 device, a Wi-Fi device, a WiMAX device, cellular communication facilities, etc.), and/or the like. The communications subsystem 630 may permit data to be exchanged with a network (such as the networks described elsewhere herein) and/or any other systems and/or devices described herein. In many embodiments, the computational system 600 may further include a working memory 635, which can include a RAM or ROM device, as described above.

The computational system 600 also can include software elements, shown as being currently located within the working memory 635, including an operating system 640 and/or other code, such as one or more application programs 645, which may include computer programs of the invention, and/or may be designed to implement methods of the invention and/or configure systems of the invention, as described herein. For example, one or more operations or procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above.

In some cases, the storage medium might be incorporated within the computational system 600 or in communication with the computational system 600. In other embodiments, the storage medium might be separate from the computational system 600 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.), then takes the form of executable code.

The term "substantially" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited unless context indicates otherwise. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A method to track thunderstorms, the method comprising:
    detecting a plurality of lightning flashes in an environmental space using a plurality of lightning detection sensors over a period of time;
    generating lightning data for each of the plurality of lightning flashes, the lightning data for each of the plurality of lightning flashes including both a position and time for each of the plurality of lightning flashes;
    assigning the plurality of lightning flashes to a plurality of thunderstorm objects, including assigning a given lightning flash of the plurality of lightning flashes to a given thunderstorm object of the plurality of thunderstorm objects based on:
        a number of previous lightning flashes assigned to the given thunderstorm object; and
        a distance between the given lightning flash and the given thunderstorm object, the distance being determined based on a most recent position of the given thunderstorm object and a position of the given lightning flash included in corresponding lightning data of the given lightning flash;
    determining an updated position of the given thunderstorm object based on positions and ages of lightning flashes, including the given lightning flash, assigned to the given thunderstorm object;
    forecasting a future position of the given thunderstorm object based at least on the updated position of the given thunderstorm object; and
    providing a warning, notice, or forecast to the public, utilities, airports, government officials, or other entities in a forecasted future location of the given thunderstorm object,
    wherein determining the updated position of the given thunderstorm object based on positions and ages of lightning flashes assigned to the given thunderstorm object comprises:
        weighting positions of the lightning flashes assigned to the given thunderstorm object with a weighting factor that inversely depends on an amount of elapsed time since a corresponding lightning flash occurred; and
        determining the updated position of the given thunderstorm object based on the weighted positions of the lightning flashes assigned to the given thunderstorm object.

2. The method of claim 1, wherein weighting positions of the lightning flashes assigned to the given thunderstorm object with the weighting factor that inversely depends on the amount of elapsed time since a corresponding lightning flash occurred comprises weighting positions of the lightning flashes assigned to the given thunderstorm object according to a weighting function that smoothly drops as a function of elapsed time from a maximum weighting value at an initial elapsed time to a minimum weighting value at a defined dwell time.

3. The method of claim 1, wherein weighting positions of the lightning flashes assigned to the given thunderstorm object with the weighting factor that inversely depends on the amount of elapsed time since the corresponding lightning flash occurred comprises assigning a weight of zero to positions of all lightning flashes assigned to the given thunderstorm object that have an elapsed time greater than a defined dwell time.

4. The method of claim 1, wherein assigning the plurality of lightning flashes to the plurality of thunderstorm objects comprises, for each of the plurality of lightning flashes:
    calculating a plurality of forces between a corresponding lightning flash and the plurality of thunderstorm objects, each of the plurality of forces representing an attraction between the corresponding lightning flash and a different one of the plurality of thunderstorm objects;
    determining which of the plurality of forces is largest; and
    assigning the corresponding lightning flash to a given one of the plurality of thunderstorm objects that has the largest one of the plurality of forces with the corresponding lightning flash.

5. The method of claim 4, wherein calculating each of the plurality of forces comprises calculating, for each corresponding lightning flash and each corresponding thunderstorm object, a number of previous lightning flashes assigned to the corresponding thunderstorm object divided by a square of the distance between the corresponding lightning object and the corresponding thunderstorm object.

6. A non-transitory computer-readable medium having computer-readable instructions stored thereon that are executable by a processor device to perform or control performance of the method of claim 1.

7. A method to track thunderstorms, the method comprising:
    detecting a plurality of lightning flashes in an environmental space using a plurality of lightning detection sensors over a period of time;
    generating lightning data for each of the plurality of lightning flashes, the lightning data for each of the plurality of lightning flashes including both a position and time for each of the plurality of lightning flashes;
    assigning the plurality of lightning flashes to a plurality of thunderstorm objects, including assigning a given lightning flash of the plurality of lightning flashes to a given thunderstorm object of the plurality of thunderstorm objects based on:
        a number of previous lightning flashes assigned to the given thunderstorm object; and
        a distance between the given lightning flash and the given thunderstorm object, the distance being determined based on a most recent position of the given thunderstorm object and a position of the given lightning flash included in corresponding lightning data of the given lightning flash;
    determining an updated position of the given thunderstorm object based on positions and ages of lightning flashes, including the given lightning flash, assigned to the given thunderstorm object;
    forecasting a future position of the given thunderstorm object based at least on the updated position of the given thunderstorm object; and providing a warning, notice, or forecast to the public, utilities, airports, government officials, or other entities in a forecasted future location of the given thunderstorm object, wherein determining the updated position of the given thunderstorm object based on the positions of the lightning flashes assigned to the given thunderstorm object comprises:

weighting the positions of the lightning flashes assigned to the given thunderstorm object according to an elapsed time since a corresponding lightning flash occurred; and calculating as the updated position of the given thunderstorm object a weighted average of the positions of the lightning flashes assigned to the given thunderstorm object by calculating an average of the weighted positions of the lightning flashes assigned to the given thunderstorm object.

8. The method of claim 7, further comprising determining a severity of the given thunderstorm object based on lightning rates, types, and/or polarities of lightning flashes and/or lightning pulses of the given thunderstorm object.

9. A non-transitory computer-readable medium having computer-readable instructions stored thereon that are executable by a processor device to perform or control performance of the method of claim 7.

10. A method to determine severity of a thunderstorm object, the method comprising:

detecting a plurality of lightning pulses of a thunderstorm object using a plurality of lightning detection sensors, the plurality of lightning pulses grouped into a plurality of lightning flashes;

generating lightning data for each of the plurality of lightning pulses and each of the plurality of lightning flashes;

determining one or more lightning rates from the lightning data;

determining one or more lightning types from the lightning data;

determining one or more lightning polarities from the lightning data; and determining a severity of the thunderstorm object based on the determined rates, types, and polarities;

forecasting a future location of the thunderstorm object; and providing a warning, notice, or forecast to the public, utilities, airports, government officials, or other entities in a forecasted future location or surrounding areas of the thunderstorm object, wherein the warning, notice, or forecast includes the determined severity of the thunderstorm object, wherein:

determining the severity of the thunderstorm object based on the determined rates, types, and polarities comprises:

determining whether a total flash rate of the plurality of lightning flashes and/or a time rate of change of the total flash rate satisfies a flash rate criterion;

determining whether the types and/or polarities satisfy at least a second criterion; and determining that the thunderstorm object is severe or not severe based on whether the flash rate criterion and the at least the second criterion are satisfied;

the flash rate criterion comprises the time rate of change of the total flash rate during an update interval being at least two standard deviations above an average of the time rate of change of the total flash rate during a preceding 10 minute interval and the total flash rate being at least 10 flashes per minute; and the at least the second criterion comprises at least one of:

the total flash rate is at least 30 flashes per update interval and a fraction of cloud flashes among the plurality of flashes is at least 0.5 and greater than or equal to a threshold that decreases linearly with increasing total flash rate;

a pulse rate of cloud pulses with negative polarity and associated with cloud flashes is greater than or equal to a second threshold that decreases linearly with increasing total flash rate; or the total flash rate is at least 55 flashes per update interval.

11. The method of claim 10, further comprising tracking the thunderstorm object, wherein the lightning data for each of the plurality of lightning flashes includes both a position and time for each of the plurality of lightning flashes and wherein tracking the thunderstorm object comprises:

assigning the plurality of lightning flashes to the thunderstorm object based on, for each corresponding lightning flash of the plurality of lightning flashes:

a number of previous lightning flashes assigned to the thunderstorm object; and a distance between the corresponding lightning flash and the thunderstorm object, the distance being determined based on a most recent position of the thunderstorm object and a corresponding position of the corresponding lightning flash included in corresponding lightning data; and determining an updated position of the thunderstorm object based on positions and ages of lightning flashes assigned to the thunderstorm object.

12. The method of claim 10, wherein determining the severity of the thunderstorm object based on the determined rates, types, and polarities further includes determining the severity of the thunderstorm object based on one or more of the following included in or derived from the rates, the types, and/or the polarities:

a time rate of change of the total flash rate;

a flash rate of the plurality of lightning flashes having a specific flash type;

a ratio of the plurality of lightning flashes having the specific flash type to a total number of the plurality of lightning flashes;

a time rate of change of the plurality of lightning flashes having the specific flash type;

a flash rate of the plurality of lightning flashes having a specific polarity;

a ratio of the plurality of lightning flashes having the specific polarity to the total number of the plurality of lightning flashes, or a time rate of change of the plurality of lightning flashes having the specific polarity.

13. The method of claim 10, wherein determining one or more lightning types from the lightning data includes determining a flash type of each of the plurality of lightning flashes and determining a pulse type of each of the plurality of lightning pulses and wherein:

the flash type of each of the plurality of lightning flashes is selected from the list consisting of cloud flash and cloud-to-ground flash; and the pulse type of each of the plurality of lightning pulses is selected from the list consisting of cloud pulse and cloud-to-ground stroke.

14. The method of claim 13, wherein determining the flash type of each of the plurality of lightning flashes from the lightning data comprises:
  determining, for each corresponding lightning flash of the plurality of lightning flashes, whether at least one lightning pulse grouped into the corresponding lightning flash has a cloud-to-ground stroke type; and
  one of:
    determining that the corresponding lightning flash has a cloud-to-ground flash type responsive to at least one lightning pulse grouped into the corresponding lightning flash having the cloud-to-ground stroke type; or
    determining that the corresponding lightning flash has a cloud flash type responsive to no lightning pulses grouped into the corresponding lightning flash having the cloud-to-ground stroke type.

15. The method of claim 10, wherein determining that the thunderstorm object is severe or not severe based on whether the flash rate criterion and the at least the second criterion are satisfied comprises:
  determining that the thunderstorm object is not severe in response to the total flash rate or the time rate of change of the total flash rate failing to satisfy the flash rate criterion; and
  determining that the thunderstorm object is severe in response to the total flash rate or the time rate of change of the total flash rate satisfying the flash rate criterion and the types and/or polarities satisfying the at least the second criterion.

16. The method of claim 15, wherein determining that the thunderstorm object is severe or not severe based on whether the flash rate criterion and the at least the second criterion are satisfied further comprises determining that the thunderstorm object is not severe in response to the total flash rate or the time rate of change of the total flash rate satisfying the flash rate criterion and the types and/or polarities failing to satisfy the at least the second criterion.

17. A non-transitory computer-readable medium having computer-readable instructions stored thereon that are executable by a processor device to perform or control performance of the method of claim 10.

18. A lightning detection system, comprising:
  a plurality of lightning detection sensors configured to detect a plurality of lightning pulses of a thunderstorm object, the plurality of lightning pulses grouped into a plurality of lightning flashes;
  a processor device communicatively coupled to the plurality of lightning detection sensors and configured to:
    track a plurality of thunderstorm objects, including:
      assign the plurality of lightning flashes to the plurality of thunderstorm objects based on a number of previous lightning flashes assigned to each of the plurality of thunderstorm objects and a distance between each of the plurality of lightning flashes and each of the plurality of thunderstorm objects; and
      determine an updated position of each of the plurality of thunderstorm objects based on positions and ages of lightning flashes assigned to each of the plurality of thunderstorm objects;
    determine a severity of one or more of the thunderstorm objects based on lightning rates, types, and/or polarities of lightning flashes and/or lightning pulses of the thunderstorm objects;
    forecast a future location of one of the thunderstorm objects; and
    provide a warning, notice, or forecast to the public, utilities, airports, government officials, or other entities in a forecasted future location or surrounding areas of the one of the thunderstorm objects, wherein the warning, notice, or forecast includes the determined severity of the one of the thunderstorm objects,
  wherein assign the plurality of lightning flashes to the plurality of thunderstorm objects comprises, for each of the plurality of lightning flashes:
    calculate a plurality of forces between a corresponding lightning flash and the plurality of thunderstorm objects, each of the plurality of forces representing an attraction between the corresponding lightning flash and a different one of the plurality of thunderstorm objects, each of the plurality of forces depending on the distance between each of the plurality of lightning flashes and each of the plurality of thunderstorm objects;
    determine which of the plurality of forces is largest; and
    assign the corresponding lightning flash to a given one of the plurality of thunderstorm objects that has the largest one of the plurality of forces with the corresponding lightning flash.

19. The lightning detection system of claim 18, wherein calculate each of the plurality of forces comprises calculate, for each corresponding lightning flash and each corresponding thunderstorm object, a number of previous lightning flashes assigned to the corresponding thunderstorm object divided by a square of the distance between the corresponding lightning object and the corresponding thunderstorm object.

20. The lightning detection system of claim 18, wherein determine the updated position of each of the plurality of thunderstorm objects based on the positions and ages of the lightning flashes assigned to each of the plurality of thunderstorm objects comprises:
  weight positions of the lightning flashes assigned to each of the plurality of thunderstorm objects with a weighting factor that inversely depends on an amount of elapsed time since a corresponding lightning flash occurred; and
  determine the updated position of each of the plurality of thunderstorm objects based on the weighted positions of the lightning flashes assigned to the corresponding thunderstorm object.

* * * * *